Jan. 6, 1959  A. R. JONES  2,867,355
APPARATUS AND METHODS USEFUL IN THE PREPARATION
OF PRECISE DILUTIONS OF LIQUIDS
Filed Sept. 2, 1954  2 Sheets-Sheet 1

INVENTOR.
ALAN RICHARDSON JONES
BY

Jan. 6, 1959 A. R. JONES 2,867,355
APPARATUS AND METHODS USEFUL IN THE PREPARATION
OF PRECISE DILUTIONS OF LIQUIDS
Filed Sept. 2, 1954 2 Sheets-Sheet 2
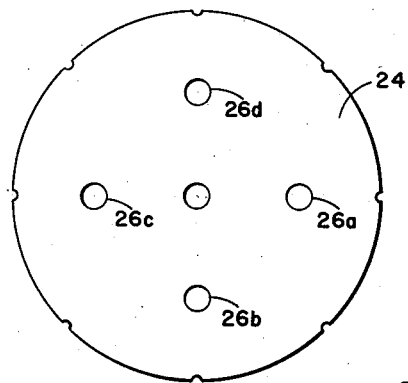
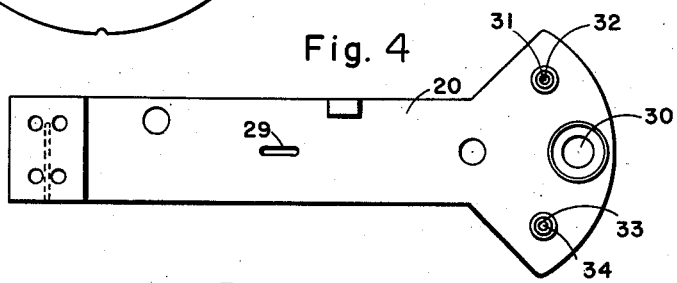
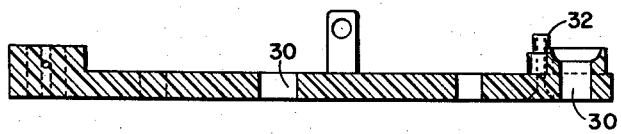
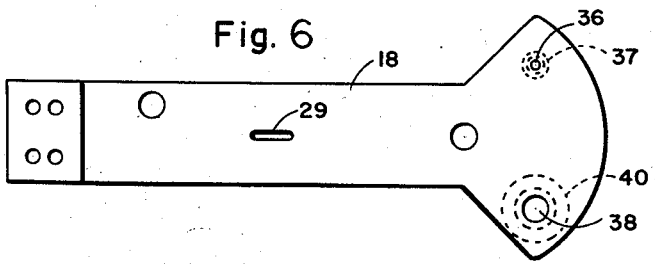
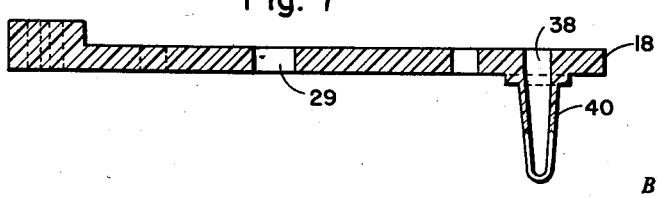
INVENTOR.
ALAN RICHARDSON JONES
BY Rowland V. Patrick

United States Patent Office 2,867,355
Patented Jan. 6, 1959

2,867,355

APPARATUS AND METHODS USEFUL IN THE PREPARATION OF PRECISE DILUTIONS OF LIQUIDS

Alan Richardson Jones, Wellesley Hills, Mass.

Application September 2, 1954, Serial No. 453,840

2 Claims. (Cl. 222—136)

This invention relates to apparatus and methods useful in the preparation of precise dilutions of liquids and has for an object the elimination of inaccuracies, expense, skilled operations, and sometimes dangers in the preparation of dilutions with pipettes.

The invention arose from dissatifaction encountered in the field of immunology with known methods for titration wherein the laboratory worker seeks to determine the greatest dilution at which an active principle, antibody or other component of a serum or other agent, remains effective. For example, this is the usual method for determining the greatest dilution at which the antibody present in a serum is capable of reacting with a specific antigen, or conversely for determining the greatest dilution of antigen with which a specific antiserum is capable of reacting.

It has hitherto been customary to prepare the appropriate series of dilutions of the serum or other reagent by the use of graduated pipettes. The preparation of accurate ranges of dilutions with pipettes calls for a high degree of skill on the part of the technician and, when painstakingly performed as it customarily is to avoid imbibition and to insure accuracy, is a slow procedure.

The purpose of the instrument described herein is to increase the speed of the procedure for preparing ranges of dilutions, to increase the accuracy and reproducibility of the procedure, and to effect some saving in the cost which is necessarily incurred in the replacement and washing of the graduated pipettes which are used in the conventional methods of preparing dilutions.

The invention will be best understood when considered in connection with the accompanying drawings showing an embodiment of apparatus useful in performing dilutions by the technique of this invention and wherein:

Figs. 3, 4 and 6 are plan views of certain of the elements going to make up the apparatus;

Figs. 5 and 7 are cross-sectional views of the elements shown in Figs. 4 and 6 respectively; and Fig. 8 is a detailed view of another of the elements of of the apparatus.

The operating parts of the apparatus are mounted on a suitable base 12 having upstanding supporting members 14 and 16 to the top of which is attached a lower plate 18 shown in Fig. 6.

Figure 2:
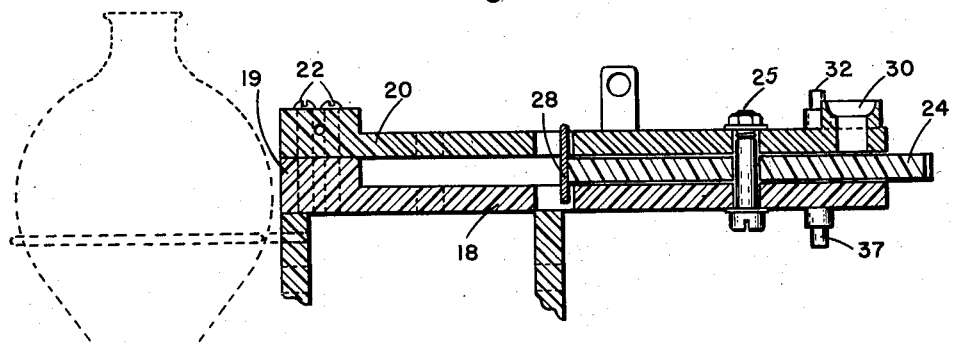
Fig. 2 is an enlarged medial cross-sectional view of the upper portion of the apparatus shown in Fig. 1.

As shown in Fig. 2, the plate 18 has an upstanding boss at one end thereof and is surmounted by an upper plate 20 which is held in spaced relation to the plate 18 after it has been affixed to the boss 19 as by screws 22.

Mounted for rotation between the separated plates 18 and 20 is a circular disk 24 journaled for rotation about a shaft 25 extending between the plates 18 and 20.

Figure 1:
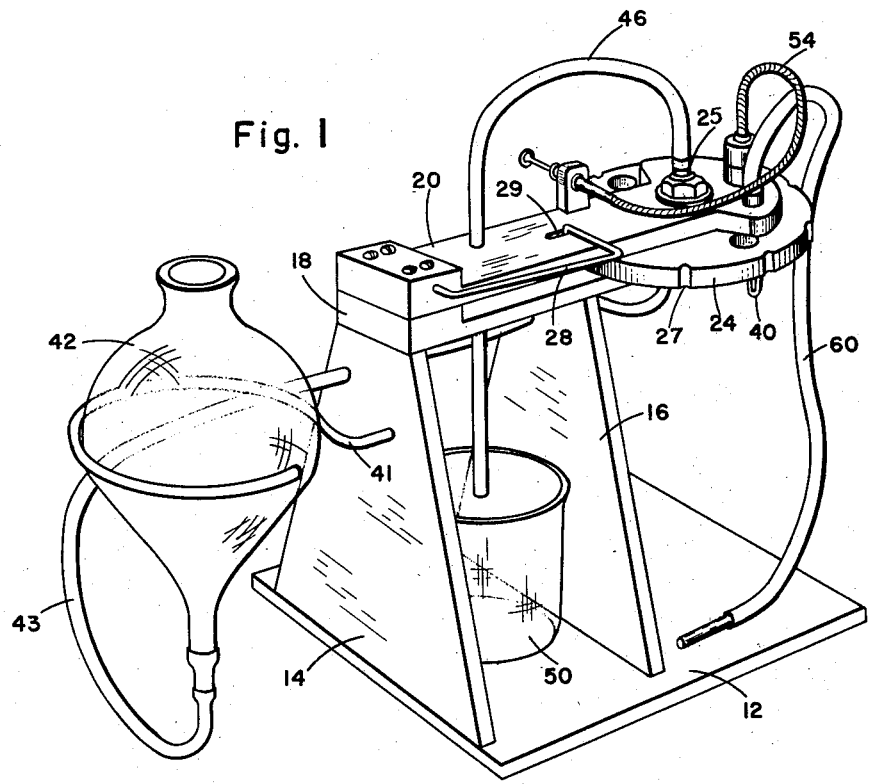
Fig. 1 is a perspective view of the apparatus.

The periphery of the disk 24 bears circumferentially spaced grooves 27 which engage a resilient spring-like detent 28 shown in Fig. 1 which is anchored in the plate 20 and has a portion extending downwardly through slots 29 in the two plates 20 and 18.

The specific disk 24 shown may therefore be indexed by hand rotation to any one of eight positions. As shown in Figs. 4 and 5, the upper plate 20 has a cup-like aperture 30 extending above and through plate 20, while disk 24 has four 90°-spaced apertures 26a, 26b, 26c and 26d, all at registering radius with cup 30.

Plate 20 also has two further apertures 31 and 33 at the same radius, one on each side of cup 30, and each surmounted with nipples 32 and 34, respectively, for attachment of flexible tubing.

The lower plate 18 similarly has two apertures 36 and 38, again at the same radius, and registering, when the parts are assembled with the apertures 31 and 33 respectively, in the upper plate 20.

Aperture 36 has a nipple 37 while aperture 38 is conviently provided with a bias cut feed tip 40 as shown in Fig. 7.

In rotation of the assembled disk 24, one of the apertures, for example 26a, can thus first be brought into register with aligned apertures 31 and 36. Upon indexing the mechanism clockwise as shown in Fig. 1, this aperture 26a may then be brought into underlying register with cup 30. With the next indexing rotation of the disk, the aperture 26a will be brought into intervening register between apertures 33 and 38. As shown in Fig. 1, the device may be provided with a bracket 41 for holding a source of liquid as in a flask 42 which may be connected by tubing 43 to the nipple 37 leading to aperture 36 in lower plate 18. The upper nipple 32 may, in turn, be provided with flexible tubing 46 leading to an overflow beaker 50. Thus, if a high level of liquid is maintained in the flask 42, liquid therefrom will be fed into any aperture 26 which comes into registry between 36 and 32, thus filling the cavity in the disk 24 with fluid from the flask.

A quantity of a different fluid may then be measured into the cup 30 and the disk 24 may then be indexed until the filled cavity in disk 24 comes into registry with the stationary cup 30, at which time the two fluids come into contact with each other and may be mixed by utilizing a hand-operated glass rod stirrer or a semi-automatic mixing device 54 (such as a plunger actuated rotatable cable of the type used on cameras) which can be temporarily slipped over the cup 30. In the case of a camera cable, when the plunger is pressed, the exposed end of the cable is rotated in the cup to cause the mixing. After the mixing operation the disk 24 is indexed to the next position, thus carrying with it so much of the mixed column of liquid as is sliced off from the bottom of the column when the disk is rotated. As the sliced section comes into registry with the apertures 33 and 38, it will pass through outlet 40, particularly if blown out by application of the breath to blowtube 60 which can be placed on nipple 34.

Since the apertures 26 are very precisely proportioned, for example each to equal the volume of liquid measured into cup 30, the instrument can thus quickly make a 1 to 1 dilution. By repeating the performance with the removed solution, the dilution can quickly become 4 to 1. Leakage-proof properties, as well as lubrication, are provided by interposing a lubricating medium, preferably, silicone oil between the two faces of the rotating disk 24 and the contacting surface of the plates 18 and 20. Of course, the size of the cavities can be designed for any proportional mixing desired.

I claim:

1. Apparatus of the character described comprising two parallel spaced horizontal stationary plates, a third plate mounted between said stationary plates for movement relative thereto, the top and bottom plates having two pairs of aligned apertures and the top plate having an aperture spaced between said pairs of apertures, an aperture in said third plate and means retaining said plates in relatively movable relation for passing said third plate aperture in sequence, first into alignment with one of said pairs of aligned apertures, second into alignment with the intermediate top plate aperture, and then into alignment with the other pair of aligned apertures, whereby said third plate aperture may carry a liquid placed therein through the first pair of apertures into communication with a liquid disposed in said intermediate top plate aperture for mixture therewith, and then may carry the volume of mixed liquid contained therein into alignment with the second pair of aligned apertures for permitting removal of the mixed liquid therefrom.

2. Apparatus as claimed in claim 1, wherein said third plate is mounted for rotary movement relative to said spaced plates and wherein all said apertures are at equal radius from the axis of rotation of said third plate.

References Cited in the file of this patent

UNITED STATES PATENTS

| | | |
|---|---|---|
| 842,167 | Berg | Jan. 29, 1907 |
| 2,097,887 | Lacey | Nov. 2, 1937 |
| 2,299,565 | Colburn | Oct. 20, 1942 |
| 2,314,031 | Colburn | Mar. 16, 1943 |